United States Patent [19]

Jennings et al.

[11] 4,345,045
[45] Aug. 17, 1982

[54] RESIN STABILIZER SYSTEMS OF ORGANOTIN SULFUR-CONTAINING COMPOUNDS AND ORGANIC OVER-BASED COMPLEXES

[75] Inventors: Thomas C. Jennings, Lyndhurst; Charles W. Fletcher, Jr., Highland Heights, both of Ohio

[73] Assignee: Dart Industries, Inc., Northbrook, Ill.

[21] Appl. No.: 98,596

[22] Filed: Nov. 29, 1979

Related U.S. Application Data

[60] Division of Ser. No. 353,910, Apr. 23, 1973, abandoned, which is a continuation-in-part of Ser. No. 116,671, Feb. 18, 1971, Pat. No. 3,764,571.

[51] Int. Cl.$^3$ ................................................ C08K 5/58
[52] U.S. Cl. .................................... 524/180; 524/425; 524/467
[58] Field of Search ................. 260/45.75 K; 252/400

[56] References Cited

U.S. PATENT DOCUMENTS 3,764,571 10/1973 Jennings et al. ............. 260/23 XA
3,803,083 4/1974 Brecker ....................... 260/23 XA Primary Examiner—V. P. Hoke
Attorney, Agent, or Firm—Jones & Askew

[57] ABSTRACT

A resin stabilizer composition which essentially contains:
(a) an organotin sulfur-containing compound, for example, organotin mercaptides, organotin mercaptoacids, organotin mercaptoacid esters, organotin sulfides, organothiostannoic acids and the like, and
(b) an organic over-based complex of Group I or II-a metal bases, for example, barium phenate or sulfonate, an over-based calcium phenate or sulfonate or the like.

These compositions remarkably contribute to the long term heat stability of vinyl halide resins. Furthermore, among other advantages, significant economies and synergistic resin heat stabilization are offered by these stabilizer compositions.

36 Claims, No Drawings

RESIN STABILIZER SYSTEMS OF ORGANOTIN SULFUR-CONTAINING COMPOUNDS AND ORGANIC OVER-BASED COMPLEXES

RELATED APPLICATIONS

This application is a divisional of application Ser. No. 353,910, filed Apr. 23, 1973, now abandoned, which in turn is a continuation-in-part of our copending application Ser. No. 116,671, filed Feb. 18, 1971, and now U.S. Pat. No. 3,764,571, issued Oct. 9, 1973.

BACKGROUND OF THE INVENTION

In U.S. Pat. No. 3,764,571, organotin stabilizer systems are described, particularly suited for the stabilization of vinyl halide resins against degradation by heat. Such stabilizer systems permit resins to be molded and worked under the action of heat into many useful articles. In accordance with that patent, a composition comprising an organotin sulfur-containing compound, a metal carboxylate and a metal base remarkably contributes to vinyl halide resin heat stability. This three-component composition also provides for a very efficient utilization of the rather expensive organotin sulfur-containing component. Heat stabilities were achieved with the three-component novel compositions which are unobtainable at the same total levels of the individual components when used alone or in two-component combinations with one another. It was also found, as disclosed and exemplified in that patent, that a metal base component, alone, contributed to the heat stabilization of vinyl halide resins in the presence of the organotin sulfur-containing compound. This application develops more fully the combination of an organotin sulfur-containing compound and a particular metal compound from the group of organic over-based complexes of alkali or alkaline earth metal bases.

SUMMARY OF THE INVENTION

The present invention is directed to improvements in resin stabilizer systems of organotin sulfur-containing compounds. This invention is predicated in part upon the unexpected heat stabilization of vinyl halide resins by organotin sulfur-containing compounds in combination with organic over-based complexes.

In particular, an organic over-based complex of an alkali or alkaline earth metal based and an organotin sulfur-containing compound together contribute highly unexpected heat stabilization to a vinyl halide resin. We have found that synergistic heat stabilizations are provided by our compositions, i.e., the sum of the stabilizing effects of an amount of each component alone upon the resin is exceeded when the same amounts of components are together in the resin formula.

Other seemingly chemically similar metal compounds have not been found by us to provide synergistic effects with the organotin component. For instance, based upon our findings of synergisms and amounts of components where synergism might be found, other seemingly chemically similar metal compounds do not display heat stabilizing synergism with the organotin component. The exact chemical mechanisms for the unexpected behaviors of our stabilizer compositions in vinyl halide resins are not completely understood. Nevertheless, such unexpected results and other advantages are empirically demonstrated in numerous operating examples of this invention, and a further understanding thereof will become apparent in view of the detailed description herein. In the stabilizer compositions of organotin sulfur-containing compounds and metal compounds of this invention, the benefits of stabilization can be realized over broad ranges of both total parts by weight of the stabilizer compositions in the vinyl halide resin and the weight ratios of each of the components with respect to the other. Particularly useful stabilizer compositions of this invention are achieved with a total parts by weight range on the order of about 0.2 to about 15 parts by weight based upon 100 parts by weight (phr) of the vinyl halide resin. A most useful range of total parts by weight of stabilizer composition is on the order of about 0.5 to about 10 phr and this depends upon the desired heat stability in a particular vinyl halide resin composition consistent with other requirements and economies.

There are certain generally preferred weight ratios of the organotin sulfur-containing compounds relative to a particular organic over-based complex. This will become apparent in view of the detailed operating examples. However, it is to be emphasized that the most desirable weight ratios of each of the essential components of the composition of this invention for a particular application and resin system can be arrived at in accordance with the teachings of this invention. Thus, in its broader aspects, this invention is not limited to weight ratios of components. It has been found that synergistic stabilization levels of a particular metal compound and a particular organotin sulfur-containing compound will vary as exemplified by the operating examples. In general, the combination of metal compound with the organotin sulfur-containing compound is utilized at total parts on the order of about 0.2 to about 15 phr; and where the metal compound is within the range of about 0.1 to about 10 phr and the organotin compound is in the range of about 0.1 to about 5 phr.

ORGANOTIN SULFUR-CONTAINING COMPONENT

The organotin sulfur-containing compounds which are of use in this invention are generally characterized as having a sulfur-containing radical or atom attached to the tin through the sulfur atom and a hydrocarbon or substituted hydrocarbon group directly attached to the tin through a carbon atom, i.e., compounds containing the

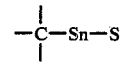

group. These compounds can also be characterized by the formula R—Sn—S wherein R represents a mono or polyvalent hydrocarbon or non-hydrocarbon substituted hydrocarbon radical. As mentioned, this combination of R-Sn-S bonds has been heretofore recognized as giving optimum stabilization. The tin bonds are usually derived from polyvalent tin by having at least one valence for bonding to the sulfur atom while the remaining valence or valences are for bonding with a hydrocarbon radical. Tin usually acts as a bi- or tetra- valent atom, but coordination complexes of tin are known where the tin behaves in even a higher valence state and, therefore, the valence state of tin can vary in the organotin compounds which can be used in this invention.

Generally, however, most organotins suitable for use in this invention are derived from tetravalent tin. Of the types of organotin compounds contemplated, included are organotin mercaptides which may be characterized by the Formula I:

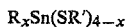

$$R_xSn(SR')_{4-x}$$

wherein R and R' represent hydrocarbon or substituted hydrocarbon radicals selcted from the group consisting of alkyl, aryl, oxyalkyl, oxyaryl and the furfuryl and tetrahydrofurfuryl radicals, and x is an integral number from 1 to 3. Examples of such groups are alkyls such as methyl, ethyl, butyl, octyl, dodecyl, and octadecyl; aryls such as phenyl, tolyl, naphthyl or xylyl; oxyalkyl and oxyaryl, such as propyloxide, butyloxide, octyloxide, benzyloxide; and the furfuryl and tetrahydrofurfuryl groups. Specific examples of organotin mercaptides in which R and R' are butyl, for example, and x varies from 1 to 3 are monobutyltin tributylmercaptide, dibutyltin dibutylmercaptide and tributyltin monobutylmercaptide. Patents exemplifying this formula $R_xSn(SR')_{4-x}$ or a similar formula and a definition of compounds represented thereby include U.S. Pat. Nos. 2,641,588; 2,641,596; 2,648,650; 2,726,254 and 2,789,963, among others.

While the simplest representatives of the organotin sulfur-containing compounds are the organotin mercaptides of the Formula I, $R_xSn(SR')_{4-x}$, as stated herein above, the important components of the compounds are the organotin group and the tin-sulfur group. The organotins are, therefore, not limited to the components of this formula, but are shown by all compounds in which a sulfur atom or mercapto radical is bound through the sulfur atom to the tin atom of the organotin radical, i.e., those organotins containing the R—Sn—S bonds. These compounds may be further defined by the Formula II.

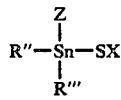

$$\begin{array}{c} Z \\ | \\ R''{-}Sn{-}SX \\ | \\ R''' \end{array}$$

wherein R", R"', SX and Z have the following significance: R" and R"' may be different monovalent hydrocarbon radicals or substituted hydrocarbon radicals, but will be generally the same radicals because the starting materials for the preparation of the organotin mercapto compounds will be generally the di- (or tri-) hydrocarbon tin halides or oxides available in commerce. The nature of these groups has in most cases no, or only a very minor, influence on the properties of the end products. R" and R"' may be aliphatic, aromatic, or alicyclic groups such as methyl, ethyl, propyl, butyl, amyl, hexyl, octyl, lauryl, allyl, benzyl, phenyl, tolyl, naphthyl and cyclohexyl, or substituted hydrocarbon groups of these groups having —OH, —NH$_2$, —CN, etc., radicals in the molecule such as cyanoethyl (of the type described in U.S. Pat. No. 3,471,538), and the like.

The group SX of Formula II, for instance, may be sulfur alone, the rest of a mercaptan, or a mercapto alcohol, or of an ester of a mercapto alcohol or mercapto acid. The patents mentioned above in the background of our copending application give examples of this. Aliphatic and aromatic mercaptans may be employed to form the group SX. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, and others. As examples of suitable mercapto alcohols, monothioethylene glycol, monothiopropylene glycol, thioglycerol, thiodiethylene glycol, and others may be mentioned. Particularly suitable are the esters of these mercapto alcohols in which the hydroxy groups are esterified by an aliphatic, aromatic, or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic mercapto acids, such as esters of beta thiopropionic acid, thiolactic acid, thiobutyric acid and mercapto lauric acid. It will be understood that the recited examples for group SX apply to SR' of Formula I and the examples of R" or R"' apply to R or R' of Formula I.

The group Z of Formula II may be a monovalent hydrocarbon radical like R" and R"', in which case the compound is a tri-hydrocarbon tin mercapto compound. The three hydrocarbon groups may have the same or different composition. Z may also be a sulfur alone or the rest of a mercapto compound linked through the S atom to the tin atom, in which case it may have the same composition as SX or a different composition. The former case represents a dihydrocarbon tin dimercapto compound and the latter case represents a mixed mercapto derivative of the dihydrocarbon stannanediol. In another sub-group, Z may be the rest of an alcohol or of a carboxylic acid linked through the oxygen of the alcoholic hydroxyl group or of the carboxylic acid group to the tin atom. Such compounds can be defined as monoesters or monoethers of hydrocarbon substituted stannanediol, in which the second hydroxyl group of the stannanediol is replaced by a mercapto compound. Thio alcohols and acids which are capable of forming such ether and ester groups are illustrated in the patents cited in the background of our copending application along with their methods of preparation. Other specific references to organotin sulfur-containing compounds as widely described in the patent art include U.S. Pat. No. 2,641,588, Col. 1, lines 32-53 to Col. 2, lines 13-46; U.S. Pat. No. 2,641,596, Col. 1, lines 10-44; U.S. Pat. No. 2,726,254, Col. 1, line 63 to Col. 2, line 19; U.S. Pat. No. 2,789,963, Col. 2, lines 35-60; U.S. Pat. No. 2,914,506, Col. 1, line 59 to Col. 4, line 8; U.S. Pat. No. 2,870,119, Col. 1, lines 27-53 and U.S. Pat. No. 3,126,400, Col. 1, lines 21-61. Other patents exemplifying these organotin sulfur-containing compounds include U.S. Pat. Nos. 3,069,447; 3,478,071; 2,998,441; 2,808,956; 3,293,273; 3,396,185; 3,485,794; 2,830,067 and 2,855,417.

Other organotin sulfur-containing compounds which are within the scope of this invention are characterized by the following Formula III:

$$(RSnS_{1.5})_n$$

wherein R is defined as above, S is sulfur and n is an integral number from about 2 to about 1000. These polymeric compounds are described in the patent literature, for example, at U.S. Pat. No. 3,021,302 at Col. 1, line 60 to Col. 2, line 17; U.S. Pat. No. 3,424,712 at Col. 3, line 34 to Col. 4, line 2; and U.S. Pat. No. 3,424,717 at Col. 3, line 13 to Col. 4, line 21. Specific reference is made to these patents at the referenced columns for more details. Other polymeric tin mercaptide type compounds having the R—Sn—S bonds characterizing the organotin sulfur-containing compounds suitable for use in this invention are exemplified in U.S. Pat. Nos. 2,809,956; 3,293,273; 3,396,185 and 3,485,794 and these exemplifications are incorporated herein by reference.

Of course, it is obvious that organotin mercaptides, organotin mercapto acids, organotin mercaptoacid esters, etc., per se form no part of this invention and the mentioned patents and their specific disclosures clearly teach these compounds and their method of production to enable anyone of ordinary skill to use them in carrying out this invention. Other literature references which are incorporated herein and which pertain to the organotin sulfur-containing component having the R-Sn-S group to exemplify the scope intended for this component in accord with the principles of this invention, include "The Development of the Organotin Stabilizers", by H. Verity Smith, Tin Research Institute, Greenford, Middlesex, pp. 15-22, (December, 1959).

ORGANIC OVER-BASED COMPLEX

The complexes used in our compositions are selected from the group of organic over-based complexes of Group I or II-a metal bases. These complexes have been found to provide synergistic heat stabilizing effectivenesses in the compositions of this invention. These complexes also offer separate and distinct advantages in the stabilization of resin systems. Our invention brings these metal complexes together as a class principally because of their unique behaviors with organotin sulfur-containing compounds and their unobvious properties. This will be appreciated, in view of this description, along with other distinct advantages.

As reported in our U.S. Pat. No. 3,764,571, the organic alkali or alkaline earth metal basic complexes or compounds have been very well developed in the patent literature. They are commonly referred to as "organic alkali or alkaline earth basic metal complexes" or "basic salts" or "super-based salts". These terms are generic to well-known classes of metal-containing organic materials which have generally been employed as lubricant additives. Such over-based materails were commercialized principally by the Lubrizol Corporation and, therefore, are also commonly referred to in the trade as "Lubrizolates". The fundamental technique for preparing such over-based materials evolved in the preparation of a soap or salt of an organic acid where the use of an excessive amount of a neutralizing agent, such as a metal oxide or hydroxide, results in the formation of a stable product which contains an amount of metal in substantial excess of that which is theoretically required to replace the acidic hydrogens of the organic acid, e.g., a carboxylic or sulfonic acid, used as the starting material. Thus, if a monosulfonic acid,

R—SO$_3$H is neutralized with a basic metal compound, e.g., barium oxide, the "normal" metal salt produced will contain one equivalent of barium for each equivalent of acid, i.e., (R—SO$_3$)$_2$Ba However, as is well known in the art, various processes are available for reacting one equivalent of an organic acid or an alkali or alkaline salt thereof (e.g., alkyl benzene sulfonic acid) with a stoichiometric excess, i.e., 2-10 equivalents of an alkaline earth inorganic base (e.g., barium oxide) in a suitable inert organic solvent to produce a basic complex in solution or dispersion form containing more than the stoichiometric amount of metal. Following these procedures, for example, an excess of 1 equivalent of barium oxide reacted with an organic sulfonic acid may be regarded as a double salt which is indicated by the structure, (R—SO$_3$)$_2$Ba.BaO Alternatively, this type of product may be regarded as a basic salt which is indicated by the structure, R—SO$_3$—Ba—OH or a combination of these structures, R—SO$_3$—Ba—OH.BaO Regardless of whichever of these structures is accepted, it has been shown that such products contain metal in stoichiometrically larger amounts than the organic acid radical and thus, the term "over-based" or "super-based" or "basic complex" is employed. The actual stoichiometric excess of metal can vary considerably, for example, from about 0.1 equivalent to about 30 or more equivalents depending on the reactions, the process conditions and the like. In the present specification and claims, the term "organic over-based complex" is used to designate materials containing a stoichiometric excess of metal and is, therefore, inclusive of those materials which have been referred to in the art as over-based, super-based, basic complex, etc., as discussed supra. Generally, the stoichiometric excess of metal for the organic over-based complexes is at least about 1 equivalent, as presently preferred, it being understood that the excess can vary from about 0.1–30 equivalents, even up to 60 or more equivalents.

Generally, most of these over-based organic complexes are prepared by treating a reaction mixture comprising the organic material to be over-based, a reaction medium of at least one inert organic solvent for the organic material, a stoichiometric excess of a metal based, and optionally a promoter. Also, the reaction product may optionally be treated with an acidic gas (e.g. CO$_2$) to reduce the free basicity of the complex. The free basicity is regarded as that amount of metal base which is titratible to a pH of about 8; whereas, the total basicity of the complex is titratable to a pH of about 3. The methods for preparing the over-based materials as well as an extremely diverse group of over-based materials are well known in the prior art as disclosed in the following U.S. Pat. Nos.

| | | | | |
|---|---|---|---|---|
| 2,616,904 | 2,616,905 | 2,616,906 | 2,616,911 | 2,616,924 |
| 2,616,925 | 2,617,049 | 2,695,910 | 2,723,234 | 2,767,209 |
| 2,777,874 | 2,789,852 | 2,839,470 | 2,915,517 | 2,959,551 |
| 2,968,642 | 2,971,014 | 3,001,981 | 3,027,325 | 3,147,232 |
| 3,172,855 | 3,194,823 | 3,232,883 | 3,242,079 | 3,242,080 |
| 3,256,186 | 3,274,135 | 3,350,308 | | |

These patents disclose exemplary processes for synthesizing the over-based organic complexes used in the systems of the invention and are, accordingly, incorporated herein by reference for their discussion of these processes, materials which can be over-based, suitable metal bases, promoters and acidic materials, as well as a variety of specific over-based products.

Organic over-based complexes of metal bases useful in this invention may be presented by the following Formula IV, it being understood that this formula is only representative of the actual over-based complexes which exist and their properties, since, as discussed above, various structural theories have been proposed and the precise structure of these organic complexes has not conclusively been established, nor is such necessary for the purposes of this invention.

$$R_nM.xM'A \qquad \text{Formula IV}$$

wherein R is an organic radical or residue of an organic material, including sulfonic or carboxylic acids or phenols; n is 1–2; M and M' are the same or dissimilar alkali or alkaline earth metals of Group I and II-a of the Periodic Table; x is a position number greater than zero, preferably at least about 1 and usually in the range of about 1–30 or more; and A represents the anion portion of the basic metal compounds used in preparing the over-based complexes. The excess basicity is sometimes referred to in the art as "metal ratio" and these organic over-based complexes or salts have a metal ratio of at least about 1.1. The term "metal ratio" is used herein to designate the ratio of the total chemical equivalents of the metal in the salt to the chemical equivalents of the metal which is in the form of a normal salt, i.e., neutral salt of the organic acid. To illustrate, a salt containing two equivalents of the metal per equivalent of the organic acid radical (i.e., R in the above formula) has a metal ratio of 2, whereas a neutral salt has a metal ratio of 1.

Organic materials which can be over-based are generally organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc., are disclosed along with methods of preparing over-based products therefrom in the above cited patents and are, accordingly, incorporated herein by reference. U.S. Pat. No. 2,777,874, identified organic acids suitable for preparing over-based organic complexes which can be useful in the compositions of the invention. Similarly, a number of the patents disclose a variety of organic acids, metal bases, etc., suitable for preparing organic over-based complexes as well as representative examples of over-based products prepared therefrom and these include: U.S. Pat. No. 2,695,910, at Col. 2, line 37 to Col. 8, line 67; U.S. Pat. No. 3,194,823 at Col. 3, line 40 to Col. 6, line 44; U.S. Pat. No. 3,274,135 at Col. 3, line 43 to Col. 6, line 49; U.S. Pat. No. 3,350,308 at Col. 1, line 45 to Col. 11, line 75; U.S. Pat. No. 3,471,403 at Col. 4, line 1 to Col. 9, line 15; and U.S. Pat. Nos. 2,717,714; 2,616,904; 2,767,209 and 3,147,232. These patents and their disclosures are incorporated herein by reference. Over-based acids wherein the acid is a phosphorus acid, a thiophosphorus acid, phosphorus acid-sulfur combination, and sulfur acid prepared from polyolefins are disclosed in U.S. Pat. Nos. 2,883,340; 2,915,517; 3,001,981; 3,108,960 and 3,232,883. Over-based phenates are disclosed in U.S. Pat. No. 2,959,551, while over-based ketones are found in U.S. Pat. No. 2,798,852. A variety of over-based materials derived from oil-soluble metal-free, non-tautomeric neutral and basic organic polar compounds such as esters, amines, amides, alcohols, ethers, sulfides, sulfoxides, and the like are disclosed in U.S. Pat. Nos. 2,968,642; 2,971,014 and 2,989,463. Another class of materials which can be over-based are the oil-soluble, nitro-substituted aliphatic hydrocarbons, particularly nitro-substituted polyolefins such as polyethylene, polypropylene, polyisobutylene, etc. Materials of this type are illustrated in U.S. Pat. No. 2,959,551. Likewise, the oil-soluble reaction products of alkylene polyamines such as propylene diamine or N-alkylated propylene diamine with formaldehyde or formaldehyde producing compound (e.g., paraformaldehyde) can be over-based. Other compounds suitable for over-basing are disclosed in the above cited patents or are otherwise well known in the art.

A class of particularly suitable organic materials which may form the R group of Formula IV above include oil-soluble organic acids, preferably those containing at least twelve aliphatic carbons although the acids may contain as few as eight aliphatic carbon atoms if the acid molecule includes an aromatic ring such as phenyl, naphthyl, etc. Representative organic acids are discussed and identified in detail in the above-cited patents. Particularly, U.S. Pat. Nos. 2,616,904 and 2,777,874 disclose a variety of very suitable organic acids. For reasons of economy and performance, oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetropropylene-substituted glutaric acid, polyisobutene (M.W.—5,000)-substituted succinic acid, polypropylene (M.W.—10,000)-substituted succinic acid, octadecyl-substituted adipic acid, chlorostearic acid, 9-methyl-stearic acid, dichlorostearic acid, stearlybenzoic acid, eicosane-substituted naphthoic acid, dilauryl-decahydronaphthalene carboxylic acid, didodecyltetralin carboxylic acid, dioctylcyclohexane carboxylic acid, mixtures of these acids, their alkali and alkaline earth metal salts and/or their anhydrides. Of the oil-soluble sulfonic acids, the mono-, di-, and tri-aliphatic hydrocarbon substituted aryl sulfonic acids and the petroleum sulfonic acids (petro-sulfonic acids) are particularly suitable. Illustrative examples of suitable sulfonic acids include mahogany sulfonic acids, petroleum sulfonic acids, monoeicosane-substituted naphthalene sulfonic acids, dodecylbenzene sulfonic acids, petrolatum sulfonic acids, monoeicosane-substituted benzene sulfonic acids, cetyl-chlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetyl-cyclopentane sulfonic acid, lauryl-cyclo-hexanesulfonic acids, polyethylene (M.W.—750) sulfonic acids, etc.

Within this group of over-based carboxylic and sulfonic acids, the barium and calcium over-based mono-, di-, and trialkylated benzene and naphthalene (including hydrogenated forms thereof) petrosulfonic acids, and higher fatty acids are especially suitable. Illustrative of the synthetically produced alkylated benzene and naphthalene sulfonic acids are those containing alkyl substituents having from 8 to about 30 carbon atoms therein. Such acids include di-isododecylbenzene sulfonic acid, wax-substituted benzene sulfonic acids, polybutene-substituted sulfonic acid, cetyl-chlorobenzene sulfonic acid, di-cetylnaphthalene sulfonic acid, di-lauryl-diphenylether sulfonic acid, diisononylbenzene sulfonic acid, di-isooctyldecylbenzene sulfonic acid, stearyl-naphthalene sulfonic acid, and the like. The petroleum sulfonic acids are a well known art recognized class of materials which have been used as starting materials in preparing over-based products since the inception of over-basing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cyclo-aliphatic sulfonic acids, including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum naphthene sulfonic acid, etc. This especially suitable group of aliphatic fatty acids includes the saturated and unsaturated higher fatty acids includes the saturated and unsaturated higher fatty acids containing from 12 to about 30 carbon atoms. Illustrative of these acids are lauric acid, palmitic acid, oleic acid, linoleic acid, linolenic acid, oleo-stearic acid, stearic acid, myristic acid, and undecalinic acid, alpha-chlorostearic acid, and alpha-nitrolauric acid. The organic acids may contain non-hydrocarbon substituents such as halo, nitro, alkoxy, hydroxyl, and the like.

The over-based organic complexes used in the stabilizer systems of the invention usually contain from about 10% to about 70% by weight of metal-containing components. As explained, the exact nature of these metal-containing components is not known. The material which is over-based may itself be a metal-containing compound, e.g., a carboxylic or sulfonic acid metal salt. Furthermore, the over-based organic complexes may be in colloidal non-Newtonian form as disclosed and described in U.S. Pat. No. 3,384,586 in contrast to single phase homogeneous systems. However, this depends upon the reaction conditions and the choice of reactants in preparing the over-based materials. Sometimes there are present in the product insoluble contaminants. These contaminants are normally unreacted basic materials such as calcium oxide, barium oxide, calcium hydroxide, barium hydroxide, or other metal base materials used as a reactant in preparing over-based material. It should be understood, however, that the removal of these contaminants is not absolutely essential to the performance of this invention.

The metal compounds used in preparing the organic over-based complexes are the basic salts of metals in Group I and Group II-a of the Periodic Table. The anionic portion of the salt can be hydroxyl, oxide, carbonate, bicarbonate, thiocarbonate, nitrate, sulfite, bisulfite, sulfide, bisulfide, halide, amide, sulfate, etc., as disclosed in the above cited patents. The presently preferred over-based materials are prepared from the mentioned alkali and alkaline earth metal oxides, hydroxides, and carbonates.

As mentioned above, promoters (materials which permit the incorporation of the excess metal into the over-based material) may be used and are also quite diverse and well known in the art as evidenced by the cited patents. A particularly comprehensive discussion of suitable promoters is found in U.S. Pat. Nos. 2,777,874; 2,695,910 and 2,616,904. These normally include the alcoholic and phenolic promoters. The alcoholic promoters include the alkanols of one to about 12 carbon atoms such as methanol, ethanol, amyl alcohol, octanol, isopropanol and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols and nonylphenols. Mixtures of various promoters are sometimes used.

Suitable acidic materials employed in the preparation of organic over-based complexes are also disclosed in the above cited patents, for example, U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc. are ordinarily employed as the acidic materials. The most common acidic materials are carbon dioxide and acetic acid.

In view of the above comprehensive treatment of the metal carboxylate and the metal base components of the system of this invention, it will be appreciated that the metal carboxylate (or thiocarboxylate) and the metal base can be prepackaged or combined to form a complex containing the two essential components. For example, calcium stearate of the general formula type $(RCOO)_2Ca$ can be complexed with the basic metal hydroxide $Ca(OH)_2$ to form $(RCOO)_2Ca \cdot Ca(OH)_2$ which contains both essential components for combination with the organotin sulfur-containing component. It has been demonstrated that such pre-reacted components will still produce synergistic results in the resin systems.

The principles of this invention and its operating parameters will be further understood with reference to the following detailed examples which serve to illustrate the types of specific materials and their amounts as used in typical vinyl halide resin formulations and the synergisms displayed by the essential combination of components in the stabilizer composition according to this invention. These examples are considered to be exemplary of this invention, and should not be considered as limiting, especially in view of applicants' broad disclosure of principles of this invention.

In the examples which follow, a standard resin formula was employed which contained 200 parts by weight of polyvinyl chloride homopolymer which is characterized as a white powder having a particle size such that 100% passes through a 42 mesh screen at a specific gravity of 1.40 (Geon 103 EP by B. F. Goodrich). Included in the standard resin formula is also 6 parts by weight of a processing aid which is an acrylic polymer in powdered form which improves the hot processing of rigid and plasticized vinyl compounds. (Acryloid K120N by Rohm and Haas Company). This material is a fine, white free flowing powder having a bulk density at about 0.30 grams per cc and a viscosity, 10% in toluene, at 600 cps (Brookfield). The processing aid merely facilitates hot processing and forms no part of this invention. A paraffin wax lubricant, i.e., a commercial wax designated 165 (H. M. Royal, Inc.) was also employed at 2 parts by weight in the resin formula.

The term "standard resin blank" or just "blank" is used hereinafter to designate the standard resin formula without heat stablizer additives. Various combinations of the organotin sulfur-containing compounds and metal compounds were mixed into the standard resin formula according to the following examples on a parts by weight basis. All amounts of such stabilizer components, in the tables and examples unless otherwise indicated, are on a parts per hundred resin basis, or as indicated above, simply "phr". The blank resin formula with and without stabilizer additives are tested in the following examples by first milling the mixtures to form a uniform polyvinylchloride composition for five minutes at 350° F., after which time long term heat stabilities of test samples were determined by oven treatment at either of two temperatures, 375° F. or 400° F., as indicated. The heat stability contribution of the stabilizer compositions (or components thereof) hereinafter are determined by ascertaining the number of minutes at the test temperature required for the samples to degrade by darkening usually to dark red or black. Thus, the term "heat stability contribution" is used to indicate the amount of heat stability in minutes contributed by a composition or component to the resin blank formula.

As discussed in the detailed description of this invention above, organic over-based complexes have been demonstrated by us to possess the desirable activity in our noval compositions. It has been explained that the exact physical or chemical nature of these compositions is not known except that, empirically, these compositions are stable and have reserved basicity by having associated therewith excess inorganic metal bases either in chemically combined form or in colloidal form. Regardless of the precise form of basicity, these organic complexes of metal bases such as lithium hydroxide, barium oxide, barium hydroxide, calcium oxide, calcium hydroxide, strontium hydroxide, etc., have been found to possess the desired properties for use in this invention. Several over-based complexes are commercially available from Lubrizol Corporation. Examples of these include "Lubrizol LD2106" which is an over-based barium phenate which features a high barium metal content in a liquid form. Typical properties of "Lubrizol LD2106" are a specific gravity of 60° F. of 1.3; a Brookfield viscosity at 77° F., 20 RPM, of 3000 cps.; a viscosity (SUS) at 210° F. of 95; a Gardner Color of 18+; and a percent weight barium content of 27.5%. Another typical of such basic metal complexes is a material sold by Lubrizol Corporation under the trademark "Lubrizol LD2103" which is an over-based barium caroboxylate characterized by viscosity at 210° F. (SUS) of 78; color, ASTM of 4; sulfated ash of 40°; a weight of 10 lbs./gal. and a percent weight barium content of 23.5%. Other products of this type are commercially available, for example, Ba-190 by Bryton Chemical Company which is a basic barium organic sulfonate; "C-300" which is a highly basic oil soluble, calcium sulfonate having excess basicity of calcium carbonate and the like. Bryton "C-300" is a 300 base numbered calcium sulfonate, the 300 designated being derived by the chemical base number of the composition which is approximately 295; and a typical analysis of such product demonstrates that it has a specific gravity at 60° F. of 1.13; a viscosity at 210° F. (SUS) of 800; a base number of 295; calcium in percent by weight of 11.8%; sulfur in percent by weight of 2.0% and sulfonate in percent by weight of 29%. These mentioned commercial products are widely available and are forms of basic organic complexes which have been described in detail herein and by reference to the patents cited.

Indeed, they are not limiting upon the scope of this invention, but it is found convenient to employ some of them in examples which follow because of their availability as commodities of commerce.

EXAMPLES 1–5

Examples 1–5 were performed to demonstrate synergism between dibutyltin bis (isooctylthioglycolate), i.e., DBT, and over-based barium phenate (LD2106, identified supra). The standard formula was used with milling and heat stability testing at 375° F. The amounts of each of the components alone and together in the vinyl halide resin are reported in Examples 1–5 of Table I.

TABLE I

| | Components | 375° F. Heat Stability Contribution |
|---|---|---|
| Example 1 | 0.5 DBT | 20' |
| Example 2 | 0.5 LD2106 | 0' |
| Example 3 | 1 LD2106 | 0' |
| Example 4 | 0.5 DBT | |
| | 0.5 LD2106 | 50' |
| Example 5 | 0.5 DBT | |
| | 1 LD2106 | 60' |

Again, as demonstrated by Example 1, 0.5 phr DBT provided a 20 minute heat stability contribution to the resin blank. In contrast, either 0.5 or 1 phr LD2106 provided no material contribution to the heat stability of the resin blank as demonstrated by Examples 2–3. However, the combination of each of the components in the same amounts together in the vinyl halide resin provided a synergistic heat stabilization of 50' and 60', respectively, in Examples 4 and 5.

For comparison with Examples 1–5, reference is made to our above identified co-pending U.S. Pat. No. 3,764,571, Examples 3 and 14–62, the latter of which are incorporated herein as Examples 6–54 as follows. These examples of our co-pending U.S. Pat. No. 3,764,571 demonstrated the performance of an organotin component in combination with an organic over-based complex (LD2106 or C-300, identified above). The organotins employed in the examples include dibutyltin bis (isooctylthioglycolate), monobutyltin tris (isooctylthioglycolate) and dibutyltin dilaurylmercaptide. Under the 400° F. heat stability evaluations, it will be appreciated that the heat stability contribution of the combination was greater than the expected contribution. It is to be observed that the heat stabilities in minutes were reported as times until blackening or darkening of the formulations under test, rather than in terms of "contribution" as used herein. However, the results are clear for comparison. The LD2106 and C-300, alone, provide no material contribution to the resin formula. However, in combination with the organotin, heat stability was observed which exceeds the expected sum of each of the components in the same amounts alone.

To illustrate the typical preparation of organic over-based complexes and their advantageous use in this invention, Examples 6–9 have been performed. In general, as compared to the previous examples of free basic materials such as calcium hydroxide, sodium carbonate, magnesium oxide and barium oxide, of Examples 1–13 of our divisional application Ser. No. 098,679, now U.S. Pat. No. 4,331,587, filed on even data herewith, these basic complexes are better adapted for uniform application of the principles of this invention since they have been found to insure compatibility of a large number of metal bases in the presence of the organotin sulfur-containing compound and metal carboxylate to achieve advantageous stabilization where a particular free metal base's (e.g., $CaCO_3$) reactivity falls short of that required for synergism. The following Examples 6–9 will illustrate the typical preparation of alkaline earth metal organic complexes.

EXAMPLE 6

73.3 grams of nonylphenol (0.33 equivalent) and 76.7 grams of barium oxide (1.00 equivalent) were added to an agitated 250 ml beaker. A fluid paste resulted. To the paste dispersion, 9.0 grams of water (1.0 equivalent) were added. Upon the addition of the water, the temperature rose from ambient temperature to about 280° F. and the mass solidified. The solid material remaining was ground into a fine powder employing a Waring blender. The powder was characterized as a free-flowing beige powder which assayed at 40.5 percent barium. This produce can be termed a barium nonylphenate basic complex and, if desired, its structure could be postulated according to the theories advanced in the description of this invention as attributed by prior art patents.

EXAMPLE 7

160.8 grams of nonylphenol (0.73 equivalent), 121.2 grams of toluene, 30.3 grams of isooctanol and 168.0 grams of BaO (2.19 equivalent) were added to a three-necked one liter flask equipped with a Dean Stark trap and condenser, stirrer and thermometer. During the agitation of the mixture contained in the flask, 19.7 grams of water (2.19 equivalent) were added. The temperature rose from ambient temperature to about 210° F. on the addition of water. The mass was heated to reflux and 6.0 grams of water removed by azeotropic distillation. The resulting complex was a greenish black hazy liquid which assayed at about 27 percent barium. This product could be characterized in a manner similar to Example 6 as a barium nonylphenate basic complex.

EXAMPLE 8

One half of the barium basic metal complex from Example 7 was carbonated with $CO_2$ gas at reflux conditions for about 4 hours to reduce the titratible free basicity of the complex to phenophathalein indicator to 0. This technique, as mentioned in the description above, is used to reduce the free basicity of the complex. The resulting complex was a gray viscous opaque fluid which assayed at 27 percent barium and can be described as a basic barium nonylphenate-carbonate complex.

EXAMPLE 9

160.3 grams of nonylphenol (0.73 equivalent), 121.2 grams of hydrocarbon solvent, 30.3 grams of isooctanol and 168.0 grams of BaO (2.19 equivalents) were added to a 1 liter three-necked flask equipped with a Dean Stark water trap, condenser, thermometer and stirrer. 19.7 grams of water (2.19 equivalents) were added to the contents of the flask. Upon addition of water, the temperature of the mixture rose from ambient temperature to about 210° F. The mixture was heated to 300° F. and blown with $CO_2$ for about 4 hours to reduce the titratible basicity of phenophathalein to zero. During carbonation, 19 grams of water were collected. The product was cooled to 220° F. and filtered. The resulting basic complex was characterized as a clear dark viscous fluid which assayed at 25 percent barium by weight. This basic complex can be described as a barium nonylphenate-carbonate basic complex.

While these complexes of Examples 6–9 were prepared from substituted phenol starting materials, organic acids such as carboxylic and sulfonic acids can be used as illustrated by U.S. Pat. No. 2,616,905. Other organic compounds can be converted to basic Group I and Group II-a metal-containing complexes. For example, U.S. Pat. No. 2,989,463 illustrates the preparation of such complexes from alcohol, alkoxides, aminealdehyde condensation products and the like.

EXAMPLES 10–19

The following Examples 10–19 demonstrate by comparison the relative effectiveness of various organic basic metal complexes of the type described in Examples 6–9 for extending the heat stability of an organotin sulfur-containing compound in the presence of an alkaline earth metal carboxylate. These examples also demonstrate the preferred effectiveness of the metal complexes in contrast to the free bases of our divisional application Ser. No. 098,679, filed on even date herewith.

The following standard formulation was employed in each of Examples 10–19.

100 parts polyvinyl chloride (Geon 103 EP identified above)

3 parts processing aid (K120N identified above)

1 part dibutyltin bis-(isooctylthioglycolate)

1 part calcium stearate

To this standard formula, in each of the Examples 11–19, a basic barium compound was introduced for comparison with one another against a standard blank of Example 10 where no barium was introduced. Each of the basic barium compounds of these examples were added to the standard formula on an equal barium basis of 0.27 parts of barium per hundred of resin. The conditions of processing of each example included the blending of the components and milling for 5 minutes at 350° F. The milling was followed by oven treatment at 375° F. to ascertain the long term heat stability of each sample by observing the time period in minutes before blackening occurred. The results appear in Table II.

TABLE II

| | Barium Introduced As | 375° F. Heat Stability |
|---|---|---|
| Example 10 | No barium introduced | 70' |
| Example 11 | BaO | 80' |
| Example 12 | $Ba(OH)_2.H_2O$ | 90' |
| Example 13 | Basic barium complex of Example 6 | >100' |
| Example 14 | Basic barium complex of Example 7 | >100' |
| Example 15 | Basic barium complex of Example 8 | >100' |
| Example 16 | Basic barium complex of Example 9 | >100' |
| Example 17 | LD2103* Basic barium complex | >100' |
| Example 18 | LD2106* Overbased barium phenate | >100' |
| Example 19 | Ba 190+ Basic barium sulphonate | 100' |

*Produced by Lubrizol Corp., identified above
+Produced by Bryton Chemical Company, identified above Table II demonstrates that the basic barium complexes of the Examples 6-9 and the commercially available Lubrizol and Bryton similar type complexes are more effective than an equal barium content introduced as a free barium oxide or barium hydroxide monohydrate. This is readily seen by an examination of Examples 11-19. In Examples 13-18, the basic barium complex had a heat stability greater than about 100 minutes. In contrast, the free barium oxide and barium hydroxide samples had heat stabilities of about 80 and 90 minutes, respectively. Accordingly, in a preferred form of the invention, the basic alkali or alkaline earth metal is furnished to the vinyl halide resin mixture along with the other essential ingredients of the stabilizer composition in the form of a basic complex. In such form, the heat extending stability is enhanced over the free base form.

EXAMPLES 20-30

In order to illustrate the advantageous effects of the stabilizer compositions according to this invention by employing various organotin sulfur-containing compounds, Examples 20-30 were performed as follows. The standard vinyl halide resin formulation contained 100 parts by weight of polyvinyl chloride (Geon 103 EP), 3 parts of processing aid (K120N) and 0.5 part of cetyl palmitate. To this standard formula, the stabilizer system on a parts by weight basis as identified in each of the Examples 20-30 below in Table III were added, wherein ($CaSt_2$) stands for calcium stearate. The conditions of milling the ingredients were 5 minutes at 350° F. The heat stability of each of the vinyl halide resin stabilized examples was determined at 400° F. in the same manner as the above examples.

TABLE III

| | Components | 400° F. Heat Stability |
|---|---|---|
| Example 20 | 1.0 dibutyltin bis(isooctylthioglycolate); 2.0 $CaSt_2$ | 35' |
| Example 21 | 1.0 dibutyltin bis(isooctylthioglycolate); 2.0 LD2106* | 35' |
| Example 22 | 1.0 dibutyltin bis(isooctylthioglycolate); 1.0 $CaSt_2$; 1.0 LD2106* | 50' |
| Example 23 | 1.0 monobutyltin tris(isooctylthioglycolate); 2.0 $CaSt_2$ | 27' |
| Example 24 | 1.0 monobutyltin tris(isooctylthioglycolate); 2.0 LD2106* | 27' |
| Example 25 | 1.0 monobutyltin tris(isooctylthioglycolate); 1.0 $CaSt_2$; 1.0 LD2106* | 40' |
| Example 26 | 1.0 dibutyltin dilaurylmercaptide; 2.0 $CaSt_2$ | 32' |
| Example 27 | 1.0 dibutyltin dilaurylmercaptide; 2.0 LD2106* | 25' |
| Example 28 | 1.0 dibutyltin dilaurylmercaptide; 1.0 $CaSt_2$; 1.0 LD2106* | 40' |
| Example 29 | 1.0 butyl thiostannoic acid; 2.0 $CaSt_2$ | 20' |
| Example 30 | 1.0 butyl thiostannoic acid; 1.0 $CaSt_2$; 1.0 LD2106* | 35' |

*Manufactured by Lubrizol Corp., as identified above

Each of these sets of Examples 20-22, 23-25, 26-28, and 29-30 illustrate that various organotin sulfur-containing compounds of the organotin mercaptoacid ester type, e.g., dibutyltin bis (isooctylthioglycolate) and monobutyltin tris (isooctylthioglycolate) can be successfully employed with an alkali or alkaline earth metal carboxylate and an organic basic metal barium complex to achieve the advantageous results according to this invention. Moreover, an organotin sulfur-containing derivative such as an organotin mercaptide, e.g., dibutyltin dilaurylmercaptide and a polymeric organo thiostannoic acid, e.g., butyl thiostannoic acid, can also be successfully employed. Reference to Examples 20-30 will also unequivocally show unexpected and unpredicated heat stabilities in the three-fold synergisms displayed with the additional advantage of substitution of a rather inexpensive basic ingredient for the organotin sulfur-containing compound as in the manner achieved in the previous examples. Table III also demonstrates the broad scope of ingredients, particularly the various organotin sulfur-containing derivatives which do possess the extended heat stability characteristics of the stabilizer compositions according to this invention.

EXAMPLES 31-42

In order to demonstrate the utility of various alkali or alkaline earth metal carboxylates and to demonstrate the effect of different metal carboxylates as one of the essential ingredients of the three-fold stabilizer formulation of this invention, Examples 31-42 were performed employing different alkali and alkaline earth metal soaps, specifically, calcium stearate ($CaSt_2$), barium stearate ($BaSt_2$), strontium stearate ($SrSt_2$) and sodium stearate (NaSt). A standard formulation was employed containing 100 parts by weight of polyvinyl chloride (Geon 103EP), 3 parts by weight of processing aid (K120N), and 1 part by weight of cetyl palmitate. In such example, a stabilizer system containing the components as listed in the table in parts by weight for each example were prepared by milling and oventesting as above. Each set of examples, namely, 31-33, 34-36, 37-39, and 40-42 demonstrates that a variety of alkali or alkaline earth metal carboxylates can be used to obtain the advantages of this invention in combination with the organotin sulfur-containing compound and the organic over-based Group I or Group II-a metal complex. Moreover, each set of examples illustrates synergism for each of the metal carboxylates employed which further demonstrates the wide utility of the invention and its practical value of being able to substitute a number of metal carboxylates and still achieve the benefits of long-term heat stability, savings in cost and versatility in vinyl halide formulation variables. Formulation versatility is important to the formulators of vinyl halide resins who alter their formulas depending upon the particular application involved.

Reference is particularly made to Examples 21, 24, 27, 32, 35, 38, 41 and 43. These particular examples specifically demonstrate performance of an organotin component in combination with an organic over-based complex (LD2106 or C-300 identified above). The organotins employed in the examples include dibutyltin bis (isooctylthioglycolate), monobutyltin tris (isooctylthioglycolate) and dibutyltin dilaurylmercaptide. It is to be observed that the heat stabilities in minutes were reported as times until blackening or darkening of the formulations under test, rather than in terms of "contribution" as used herein. However, the results are clear for comparison. The LD2106 and C-300, alone, provide no material contribution to the resin formula. However, in combination with the organotin, heat stability was observed which exceeds the expected sum of each of the components in the same amounts alone.

TABLE IV

| | Components | 400° F. Heat Stability |
|---|---|---|
| Example 31 | 1.0 DBT; 2.0 CaSt$_2$ | 35' |
| Example 32 | 1.0 DBT; 2.0 LD2106* | 35' |
| Example 33 | 1.0 DBT; 1.0 CaSt$_2$; 1.0 LD2106* | 50' |
| Example 34 | 1.0 DBT; 2.0 BaSt$_2$ | 35' |
| Example 35 | 1.0 DBT; 2.0 LD2106* | 35' |
| Example 36 | 1.0 DBT; 1.0 BaSt$_2$; 1.0 LD2106* | 50' |
| Example 37 | 1.0 DBT; 2.0 SrSt$_2$ | 30' |
| Example 38 | 1.0 DBT; 2.0 LD2106* | 35' |
| Example 39 | 1.0 DBT; 1.0 SrSt$_2$; 1.0 LD2106* | 45' |
| Example 40 | 1.0 DBT; 2.0 NaSt | 22' |
| Example 41 | 1.0 DBT; 2.0 LD2106* | 35' |
| Example 42 | 1.0 DBT; 1.0 NaSt; 1.0 LD2106* | 40' |

*Manufactured by Lubrizol Corp., identified supra.

It will also be observed in Table IV that calcium, barium and strontium or the alkaline earth Group II-a metal type of metal carboxylate performs slightly better than the alkali sodium metal carboxylate.

In each of the above examples, the vinyl halide resin which was employed is a homopolymer of vinyl chloride, i.e., polyvinyl chloride. It is to be understood, however, that this invention is not limited to a particular vinyl halide resin such as polyvinyl chloride, of course. Other halogen-containing resins which are employed and illustrate the principles of this invention include chlorinated polyethylene, chlorinated polyvinyl chloride and the vinyl halide resin type. Vinyl halide resin, as understood herein, and as appreciated in the art, is a common term and is adopted to define those resins or polymers usually derived by polymerization of copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride $H_2C:CHCl$ to polyvinyl chloride $(CH_2—CHCl—)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers; and the like. Of course, the vinyl halide commonly used in the industry is chloride, although others such as bromide and fluoride may be used.

It is also to be understood that we are aware of prior art in which calcium carbonate has been used interchangeably with finely divided silica to permit a PVC composition to be compounded into high impact resistant products and which products may also contain dibutyltin mercapto ester and dibutyltin mercaptide as stabilizers along with calcium stearate as a lubricant. Such is exemplified by U.S. Pat. No. 3,407,171. However, calcium carbonate of the type which is commercially available and referred to as having a mean particle size of about 0.6 microns (as mentioned earlier herein) shows no improvement in heat stability over a composition which does not contain such a calcium carbonate. But significantly, as we have discovered, when an alkaline earth metal base exists in such a chemically active dispersed state as an organic over-based complex, remarkable heat stability results are achieved. Tests have demonstrated that heat stabilities can even be doubled when the basic inorganic Group I or Group II-a metal is provided in the form of a complex where it is believed to exist either in chemically combined form or in a fine state of subdivision on the order of about 50-200 Å such that synergism is achieved as has been demonstrated in the examples heretofore. It has also been demonstrated that calcium carbonate when it does exist in basic complex salt indeed offers significant advantages and unanticipated heat stability in accordance with the principles of this invention. To exemplify synergism displayed by calcium carbonate in its metal complex dispersed state, in contrast to a free base commercial powder on the order of about 0.6 microns in particle size which shows no improvement over an identical system which does not contain such calcium carbonate, the following examples have been performed.

EXAMPLES 43-45

The standard formula containing 100 parts by weight of polyvinyl chloride and 3 parts by weight of processing aid is compounded with the materials as specified in Table V for each example in parts by weight. The milling as in previous examples, took place at 350° F. for about 5 minutes. Thereafter, the materials of each of the Examples 43-45 were oven tested for heat stability at 400° F. as above and the results appear in Table V as follows.

TABLE V

| | Components | | 400° F. Heat Stability |
|---|---|---|---|
| Example 43 | 1.0 dibutyltin bis(isooctyl-thioglycolate) | 2.0 C-300* | 30' |
| Example 44 | 1.0 dibutyltin bis(isooctyl-thioglycolate) | 2.0 barium stearate | 35' |
| Example 45 | 1.0 dibutyltin bis(isooctyl-thioglycolate) | 1.0 C-300* 1.0 barium stearate | 50' |

*A highly basic oil soluble, calcium sulfonate containing calcium carbonate excess basicity, manufactured by Bryton Chemical Company, as identified above.

This table demonstrates that calcium carbonate contained in an organic basic metal complex indeed behaves in a synergistic manner in the presence of an organotin sulfur-containing compound and an alkaline earth metal carboxylate. As shown, the heat stability of the synergistic three-component stabilizer system was extended 15 minutes beyond that of either the alkaline earth metal carboxylate or the basic complex when employed alone.

EXAMPLES 46-50

The effect of various calcium carboxylates on the heat stability of an organotin sulfur-containing compound (DBT identified above) and an organic over-based complex (LD2106, identified above) was determined as follows. A standard formula containing 100 parts by weight of polyvinyl chloride, 3 parts by weight of processing aid (K120N identified above) and 0.25 parts of polyethylene A/C lubricant by Allied Chemical Corp. is compounded with the materials as specified in Table VI for each example in parts by weight. The milling, as in previous examples, took place at 350° F.

for about 5 minutes. Thereafter, samples of each of the Examples 46–50 were oven tested for heat stability at 400° F. as above and the results appear in Table VI as follows.

TABLE VI

|  | Components | 400° F. Heat Stability |
|---|---|---|
| Example 46 | 1.0 DBT; 1.0 LD2106* | 30' |
| Example 47 | 1.0 DBT; 1.0 LD2106*; 1.0 OP Wax* | 35' |
| Example 48 | 1.0 DBT; 1.0 LD2106*; 1.0 Ca Stearate | 50' |
| Example 49 | 1.0 DBT; 1.0 LD2106*; 1.0 Ca Laurate | 50' |
| Example 50 | 1.0 DBT; 1.0 LD2106*; 1.0 Ca Benzoate | 40' |

*Identified above

Table VI demonstrates that various calcium carboxylates of the aliphatic monocarboxylic acid and the aromatic monocarboxylic type of about $C_6$ to about $C_{32}$ carbon atoms will provide the advantageous results according to this invention. Calcium salts of fatty acids, e.g., calcium stearate and calcium laurate, behave better because the minimum time to blackening at 400° F. was extended at least 10 minutes over calcium benzoate and OP Wax. Therefore, as mentioned in the description of this invention, the nonlubricating alkaline earth metal salts of aromatic carboxylic acids are suitable for use in this invention as well as the lubricating fatty acid salts. Similarly, the higher carbon atom containing carboxylic acid salts $C_{28}$–$C_{32}$ (OP Wax) are suitable.

EXAMPLES 51–54

As developed in the description of this invention, the metal salt component and the base component of this invention may be pre-mixed or pre-reacted to form a complex prior to their combination with the organotin sulfur-containing compound. Examples 51–54 demonstrate the effect of pre-reacting a metal carboxylate, e.g., calcium stearate with a metal base, e.g., calcium hydroxide, in comparison to calcium stearate and calcium hydroxide when employed alone. For this purpose, a standard formula of 100 parts of polyvinyl chloride and 3 parts of processing aid (K120N) is compounded with the materials as specified in Table VII for each example in parts by weight. The milling, as in previous examples, took place at 350° F. for about 5 minutes. Thereafter, the samples of each of the Examples 51–54 were oven tested for heat stability at 400° F. as above and the results appear in Table VII as follows.

The pre-reacted calcium stearate and calcium hydroxide i.e., $St_2Ca.Ca(OH)_2$ was prepared by charging 272 grams (1.0 equivalent) of commercial stearic acid (hydrogenated tallow fatty acid) to a 500 ml beaker and heating to 270° F. with agitation. Thereafter, 76.4 grams of 97 percent calcium hydroxide (2.0 equivalents) was added over 15 minutes at about 270°–310° F. The reaction mixture was held for 20 minutes at about 310° F. to dehydrate the reaction mass. Thereafter, the mass was cooled whereupon it solidified. The mass was then ground to a powder. The product yield was about 330 grams and assayed at 12 percent calcium. The powdered product was employed in Table VII Example 53 as follows.

TABLE VII

|  | Components | 400° F. Heat Stability |
|---|---|---|
| Example 51 | 1.0 DBT | 20' |
| Example 52 | 1.0 DBT; 1.0 CaSt$_2$ | 25' |
| Example 53 | 1.0 DBT; 1.0 St$_2$Ca.Ca(OH)$_2$ | 30' |
| Example 54 | 1.0 DBT; 1.0 Ca(OH)$_2$ | 25' |

Examples 51–54 demonstrate that the complexed calcium stearate-calcium hydroxide on an equal parts by weight basis, when compared to the use of calcium stearate and calcium hydroxide alone, is better. It is to be observed that the complex contains about 0.5 molar parts each component and yet, the heat stability was improved.

As stated above, in each of the examples the vinyl halide resin which was employed is a homopolymer of vinyl chloride, i.e., polyvinyl chloride. It is to be understood, however, that this invention is not limited to a particular vinyl halide resin such as polyvinyl chloride, or course. It is also to be understood that other components such as lubricants, processing aids, pigments, other stabilizers, other non-halogenated resins, etc., can be incorporated in the resin compositions and the benefits of this invention can be achieved.

The exact mechanism for the beneficial effects evident by the empirical examples, as mentioned above, is not completely understood nor do applicants wish to be held to any theory. Rather, with the numerous empirical examples demonstrated above, coupled with the detailed teachings of the organotin sulfur-containing compounds and organic over-based complexes, we have defined the best modes of our invention and it will become obvious to those of ordinary skill in this art that other equivalent materials can likewise be employed in view of our description.

What is claimed is:

1. A resin stabilizer composition which consists essentially of, an organotin sulfur-containing compound having a

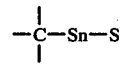

group, and a metal compound selected from the group consisting of an organic over-based complex of an alkali and an alkaline earth metal base, and mixtures of said metal compounds, said organotin and metal compound components in relative amounts which together provide a synergistic stabilizing effectiveness upon said resin.

2. The composition of claim 1 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

3. The composition of claim 1 wherein said metal base of said organic complex is selected from the group consisting of an oxide, hydroxide, carbonate, bicarbonate, thiocarbonate, sulfide, bisulfide, sulfite or bisulfite and mixtures thereof.

4. The composition of claim 3 wherein said organic complex is derivable from the reaction of an acidic organic material selected from the group consisting of a carboxylic acid, thiocarboxylic acid, sulfonic acid, organic phosphorus acid, phenols, substituted phenols, and alkali or alkaline salts of such acids or phenols, and mixtures thereof, with stoichiometric excess of said metal base.

5. The composition of claim 1 wherein said components are present in a weight ratio in the range of about 0.1–5 of the organotin component to about 0.1–10 of the metal component.

6. A vinyl halide resin composition which comprises a vinyl halide resin and, as a heat stabilizer, an effective amount of a composition consisting essentially of, an organotin sulfur-containing compound having a

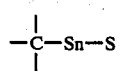

group, and a metal compound selected from the group consisting of an organic over-based complex of an alkali and an alkaline earth metal base, and mixtures of said metal compounds, said organotin and metal compound components in relative amounts which together provide a synergistic stabilizing effectiveness upon said resin.

7. The composition of claim 6 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

8. The composition of claim 6 wherein said metal base of said organic complex is selected from the group consisting of an oxide, hydroxide, carbonate, bicarbonate, thiocarbonate, sulfide, bisulfide, sulfite, or bisulfite and mixtures thereof.

9. The composition of claim 8 wherein said organic complex is derivable from the reaction of an acidic organic material selected from the group consisting of a carboxylic acid, thiocarboxylic acid, sulfonic acid, organic phosphorus acid, phenols, substituted phenols, and alkali or alkaline salts of such acids or phenols, and mixtures thereof, with a stoichiometric excess of said metal base.

10. The composition of claim 6 wherein said effective amount is on the order of about 0.2 to about 15 parts by weight per 100 parts resin.

11. The composition of claim 6 wherein the relative amount of said organotin component is in the range of about 0.1 to about 5 parts by weight per 100 parts resin and the relative amount of metal compound present is in the range of about 0.1 to about 10 parts by weight per 100 parts resin.

12. The composition of claim 6 wherein the organotin sulfur-containing compound is selected from a group consisting of dibutyltin bis (isooctylthioglycolate), monobutyltin tris (isooctylthioglycolate), dibutyltin dilaurylmercaptide, butyl thiostannoic acid, dioctyltin bis (isooctylthioglycolate), dimethyltin bis (isooctylthioglycolate), monomethyltin tris (isooctylthioglycolate), dibutyltin bis (isooctyl-beta-mercapto-propionate), and mixtures thereof.

13. The composition of claim 6 wherein the metal compound is selected from a group consisting of over-based barium phenate, over-based barium carboxylate, over-based barium sulfonate, over-based calcium sulfonate, over-based calcium phenate, and mixtures thereof.

14. The composition of claim 12 wherein the relative amount of said organotin component is in the range of about 0.1 to about 5 parts by weight per 100 parts resin and the relative amount of metal compound present is in the range of about 0.1 to about 10 parts by weight per 100 parts resin.

15. A vinyl halide resin composition which comprises a polyvinyl chloride resin and, as a heat stabilizer, an effective amount of a composition consisting essentially of, an organotin sulfur-containing compound selected from the group consisting of dibutyltin bis (isooctylthioglycolate), monobutyltin tris (isooctylthioglycolate), dibutyltin dilaurylmercaptide, butyl thiostannoic acid, dioctyltin bis (isooctylthioglycolate), dimethyltin bis (isooctylthioglycolate), monomethyltin tris (isooctylthioglycolate), dibutyltin bis (isooctyl-beta-mercapto-propionate), and mixtures thereof, and a metal compound selected from the group consisting of over-based barium phenate, over-based barium carboxylate, over-based barium sulfonate, over-based calcium sulfonate, over-based calcium phenate, and mixtures thereof, said organotin and metal compound components in relative amounts which together provide a synergistic stabilizing effectiveness upon said resin.

16. The composition of claim 15 wherein said effective amount is on the order of about 0.2 to about 15 parts by weight per 100 parts resin.

17. The composition of claim 16 wherein the relative amount of said organotin component is in the range of about 0.1 to about 5 parts by weight per 100 parts resin and the relative amount of metal compound present is in the range of about 0.1 to about 10 parts by weight per 100 parts resin.

18. A stabilizer composition for increasing heat resistance to discoloration of polyvinyl chloride resins comprising:

at least one organotin mercaptocarboxylic acid ester having a tetravalent tin atom linked directly to carbon and to sulfur and from one to two hydrocarbon groups of 1–18 carbons linked each to tin, the mercaptocarboxylic acid ester grop being linked to tin through sulfur, and an over-based composition of at least one alkaline earth metal carbonate and at least one of an organic alkaline eath metal salt of an aromatic compound selected from the group consisting of sulfonic acids, substituted phenols and phenol; wherein the weight ratio of the organotin mercaptocarboxylic acid ester to the combined alkaline earth metal carbonate organic salt components is within the range of from about 1:100 to 50:1 and the ratio of the number of total alkaline earth metal equivalents to the number of equivalents of the organic acid residue of the organic salt is at least about 1:1.

19. A polyvinyl chloride resin composition having heat resistance to discoloration comprising a polyvinyl chloride resin and a stabilizer composition in accordance with claim 18 in a weight ratio of from about 0.2 to 15 parts of stabilizer composition to 100 parts of resin.

20. A polyvinyl chloride resin composition comprising a polyvinyl chloride resin, a stabilizer composition according to claim 18, and a lubricant selected from the class of calcium stearate, paraffin wax, and cetyl palmitate.

21. A stabilizer composition according to claim 18 wherein the hydrocarbon group of organotin mercaptocarboxylic acid ester linked to tin through carbon is butyl.

22. A stabilizer composition in accordance with claim 18 in which the hydrocarbon group of the organotin mercaptocarboxylic acid ester linked to tin through a carbon is octyl.

23. A stabilizer composition in accordance with claim 18 wherein the hydrocarbon group of the organotin mercaptocarboxylic acid ester linked to tin through carbon is methyl.

24. A stabilizer composition in accordance with claim 18 wherein the organotin mercaptocarboxylic acid ester is a thioglycolate ester.

25. A stabilizer composition in accordance with claim 18 in which the organotin mercaptocarboxylic acid ester is a β-mercaptopropionate ester.

26. A stabilizer composition according to claim 18 wherein the organotin mercaptocarboxylic acid ester is an organotin mercaptocarboxylic acid ester sulfide.

27. A stabilizer composition according to claim 18 wherein the organotin mercaptocarboxylic acid ester is a dimethyltin mercaptocarboxylic acid ester.

28. A stabilizer composition according to claim 18 wherein the organotin mercaptocarboxylic acid ester is dioctyltin di-(isooctylthioglycolate).

29. A stabilizer composition according to claim 18 wherein the organotin mercaptocarboxylic acid ester is selected from the class consisting of dibutyltin di(isooctylthioglycolate) and monobutyltin tris (isooctylthioglycolate).

30. A stabilizer composition in accordance with claim 18 wherein the organic salt is a salt of a sulfonic acid.

31. A stabilizer composition according to claim 30 wherein the organic salt is a polydodecyl benzene sulfonate.

32. A stabilizer composition in accordance with claim 18 in which the organic salt is a mixed salt or combination of salts derived from mixed organic acids.

33. A polyvinyl chloride resin composition having heat resistance to discoloration comprising a polyvinyl chloride resin and a stabilizer composition in accordance with claim 24.

34. A polyvinyl chloride resin composition comprising a polyvinyl chloride resin and a stabilizer composition in accordance with claim 25.

35. A polyvinyl chloride resin composition comprising a polyvinyl chloride resin and a stabilizer composition in accordance with claim 26.

36. A polyvinyl chloride resin composition comprising a polyvinyl chloride resin and a stabilizer composition in accordance with claim 30.

* * * * *